United States Patent [19]

Hiraoka et al.

[11] Patent Number: 5,482,656
[45] Date of Patent: Jan. 9, 1996

[54] NON-LINEAR OPTICAL DEVICES EMPLOYING A POLYSILANE COMPOSITION AND A POLYSILANE COMPOSITION THEREFOR

[75] Inventors: Toshiro Hiraoka; Shin-ichi Nakamura, both of Kanagawa; Yoshihiko Nakano, Tokyo; Shinji Murai, Chiba; Shuzi Hayase, Kanagawa, all of Japan

[73] Assignee: Kabushiki Kaisha Toshiba, Kawasaki, Japan

[21] Appl. No.: 205,628

[22] Filed: Mar. 4, 1994

[30] Foreign Application Priority Data

Mar. 4, 1993 [JP] Japan .................... 5-044023

[51] Int. Cl.$^6$ ............... H01B 1/22; H01B 1/20
[52] U.S. Cl. .............. 252/514; 252/512; 524/439; 524/440; 524/588
[58] Field of Search ................. 252/512, 514; 524/439, 440, 588

[56] References Cited

U.S. PATENT DOCUMENTS

| | | | |
|---|---|---|---|
| 4,590,253 | 5/1986 | Hasegawa et al. | 528/14 |
| 4,871,590 | 10/1989 | Merz et al. | 427/387 |
| 4,889,770 | 9/1990 | Ona et al. | 428/447 |
| 5,047,283 | 9/1991 | Leatherman | 428/409 |
| 5,162,477 | 11/1992 | Mori et al. | 528/14 |
| 5,358,987 | 10/1994 | Kanai et al. | 524/254 |

FOREIGN PATENT DOCUMENTS 2-27430  9/1990  Japan .

*Primary Examiner*—Paul Lieberman
*Assistant Examiner*—Gregory R. Delcotto
*Attorney, Agent, or Firm*—Foley & Lardner

[57] ABSTRACT

A polysilane composition containing conductor or semiconductor particles useful as a portion of a non-linear optical device.

22 Claims, 1 Drawing Sheet

NON-LINEAR OPTICAL DEVICES EMPLOYING A POLYSILANE COMPOSITION AND A POLYSILANE COMPOSITION THEREFOR

BACKGROUND OF THE INVENTION

1. Field of the Invention

This invention relates to a polysilane composition suitable for use, for example, as a third-order non-linear optical material and to a non-linear optical device employing the polysilane composition.

2. Description of Related Art

Polysilanes are organic polymers whose main chain is of Si—Si structure, wherein the side chains usually have hydrophobic groups such as alkyl groups or aryl groups. Due to delocalization of the a electrons of the Si—Si bonds, these polymers have photosensitivity, semiconducting characteristics, non-linear optical characteristics, and the like. In particular, the σ-conjugate system of the Si—Si main chain of the polysilane is transparent to light in the visible region, which is very promising in regard to application in the field of optoelectronics.

A non-linear optical device making use of the nonlinear optical effect of polysilane is disclosed in Japanese Patent Publication No. 1-183420. However, the third-order non-linear optical constant $\chi^{(3)}$ of polysilane is not particularly great, being about $10^{-12}$ esu, while values less than about $10^{-10}$; generally from about $10^{-10}$ to about $10^{-2}$ esu are generally necessary in an optical application. It has not therefore proved possible to obtain optical output of sufficient intensity simply by non-linear polarization of polysilane.

SUMMARY OF THE INVENTION

Accordingly, one object of the present invention is to provide a polysilane composition whose third-order non-linear optical constant is large, which shows a high non-linear response rate, and which has excellent non-linear optical characteristics.

A further object of this invention is to provide a non-linear optical device wherein a polysilane composition having excellent non-linear characteristics as described above is used in an optical waveguide complex.

A further object of the present invention is to provide a non-linear optical device having a high third-order non-linear optical constant $\chi^{(3)}$.

Further objects of the invention are to provide methods of making the polysilane composition and the non-linear optical devices.

In accomplishing the foregoing objectives, there has been provided, in accordance with one aspect of the present invention, a non-linear optical device which has a third-order non-linear optical constant of at least $1 \times 10^{-10}$ esu.

In accordance with another aspect of the present invention, there has been provided a polysilane composition which comprises:

(a) a polysilane having a repeating unit represented by formula (I)

where, $R^1$ and $R^2$ independently are selected from the group consisting of a hydrogen atom, a substituted or unsubstituted alkyl group, a substituted or unsubstituted aryl group and a substituted or unsubstituted aralkyl group; and (b) at least one kind of particles selected from the group consisting of conductors and semiconductors.

In accordance with another aspect of the present invention, there has been provided a non-linear optical device which comprises an optical waveguide complex wherein at least part of this optical waveguide complex is formed of a composition containing;

(a) a polysilane having a repeating unit represented by formula (I)

where $R^1$ and $R^2$ independently are selected from the group consisting of a hydrogen atom, a substituted or unsubstituted alkyl group, a substituted or unsubstituted aryl group and a substituted or unsubstituted aralkyl group; and (b) at least one kind of particles selected from the group consisting of conductors and semiconductors Specifically, a polysilane composition according to the invention and a non-linear optical device according to the invention using this polysilane composition are characterized in that conductor or semiconductor particles are dispersed in the polysilane.

Further objects, features, and advantages of the present invention will become apparent from a detailed description of the preferred embodiments which follow.

DETAILED DESCRIPTION OF THE PREFERRED EMBODIMENTS

Figure 1:
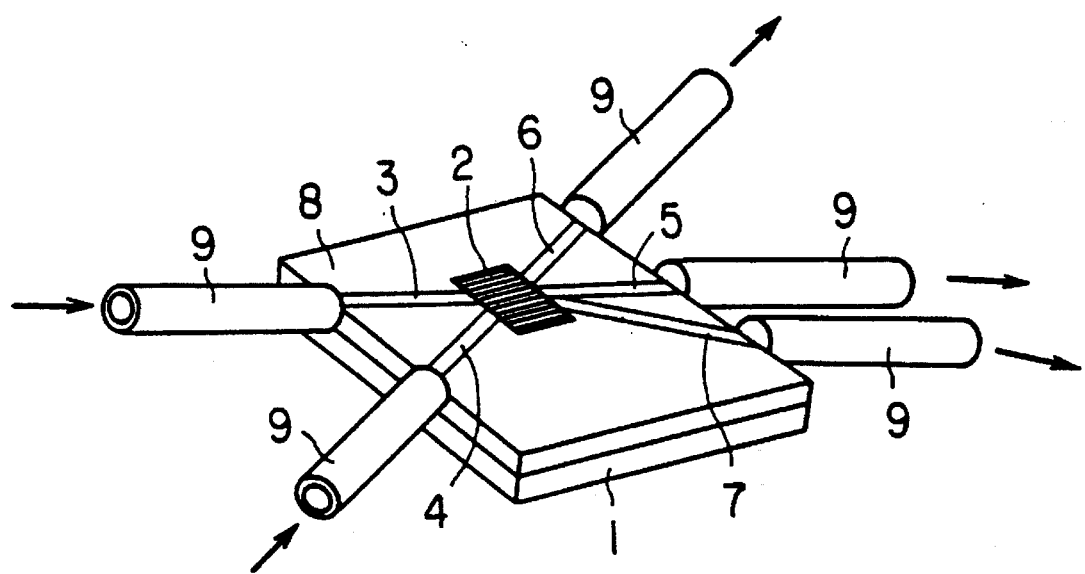
FIG. 1 is a perspective view showing an example of a non-linear optical device according to the invention.

In this invention, in the polysilane having a repeating unit shown in above general formula (I), the main chain contains Si—Si bonds. The side chains $R^1$ and $R^2$ are independently a hydrogen atom, a substituted or unsubstituted alkyl group, a substituted or unsubstituted aryl group, or a substituted or unsubstituted aralkyl group, which may optionally be substituted with any desired substitute. $R^1$ and $R^2$ can be any aryl, alkyl, or aralkyl group, which may optionally be substituted with any desired substituent. Preferably, the alkyl groups contain 1 to 24 carbon atoms, the aryl groups contain 6 to 24 carbon atoms, and the aralkyl groups contain 7 to 24 carbon atoms.

In this invention, the weight average molecular weight of the polysilane may be varied within wide limits depending on the ultimate use of the polysilane and is preferably 5,000–1,000,000 and even more preferably 10,000–50,000, where the value of n is preferably 20–10,000 and even more particularly 80–500. The reason for the preferred molecular weight is that if the weight average molecular weight of the polysilane is too small, its polymeric properties may not be fully exhibited and thus it may be difficult to form useful products, such as films. On the other hand, if the weight average molecular weight of the polysilane is too large, there is a risk of it having lowered solvent solubility, which is undesired in certain methods and applications involving the polysilane.

Any polysilane can be used in the present invention. Specific examples of polysilanes typically used in this invention are shown in Table A which follows. The degree of polymerization (n) can be controlled by known methods so as to give the desired molecular weight of the polymer.

As previously mentioned, the alkyl, aryl, and/or aralkyl groups of the polysilane can be substituted with any desired substituent. Suitable substituents may be selected based upon the desired properties of the final composition. Furthermore, in the present invention, the inventors have found that partially substituted polysilanes are particularly desirable wherein at least one of $R^1$ and $R^2$ in the above general formula (I) is an alkyl, aryl, or aralkyl group having a hydrophilic group or linkage. Any hydrophilic group or linkage is useful. Particularly useful groups or linkages include a hydroxyl group, amino group, carboxylic acid group, carbonyl group, mercaptyl group, ether linkage, amide linkage, ester linkage, carbamate linkage, carbonate linkage, imide linkage, thioether linkage, and thioester linkage. The present inventors have found that since polysilanes in which a hydrophilic group or linkage as described above is introduced into a side chain are amphiphilic, there is good dispersion of conductor or semiconductor particles in the polysilane composition obtained. As a result, the non-linear optical characteristics are further enhanced. Specific examples of such polysilanes are shown in Table B which follows.

In this invention, materials which have a resistivity of less than about $10^{-4}$ Ω-cm are designated as conductors, and materials which have a resistivity in the range of about $10^{-4}$–$10^{10}$ Ω-cm are designated as semiconductors. However, there is no particular restriction on the shape or mode of dispersion of the conductor or semiconductor particles which are dispersed in the polysilane as described above, but preferably the particle size is in the range 10–500 Å. The reasons for this are that conductor or semiconductor particles of particle size less than 10 Å are difficult to manufacture; on the other hand, if the particle size of the conductor or semiconductor particles exceeds 500 Å, they often do not display a good quantum size effect, which is a disadvantage in certain applications. In particular, there is a risk that a polysilane composition having a large third-order non-linear optical constant may not be obtained. It is further desirable in this invention to use conductor or semiconductor particles of particle size 10–100 Å and whose particle size is substantially uniform.

Any known conductor or semiconductor particles can be used in the polysilane composition of the present invention. There is no particular restriction to particular metals, alloys, or chemical compounds, on the conductors used as such particles. But in order to obtain a good interface effect with the polysilanes, noble metals, which are not liable to surface oxidation, are particularly desirable. Specific examples of useful noble metals are those selected from one or more of the group consisting of gold, silver, platinum, palladium, copper, and rhodium. Semiconductors used preferably have a resistivity of no more than about $10^9$ Ω-cm. Specific examples of useful semiconductors are IIIA/VA group compound semiconductors such as GaAs, InAs, InP or IIB/VIA group compound semiconductors such as CdS, CdSe, CdTe. Group refers to the group of the periodic table.

In this invention the blending amount of the aforementioned conductor or semiconductor particles can be varied within wide ranges depending on the intended utility of the composition and is preferably set at 1–40 volume % of particles based on the volume of the polysilane, and even more preferably 5–20 volume %. The reason for this is that, if the blending amount of conductor or semiconductor particles is too small, there is often little enhancement of the third-order non-linear optical effect. On the other hand, if the blending amount of conductor or semiconductor particles is too large, dispersion of the particles is often decreased with the result that a good quantum size effect is not shown, with the risk that a large non-linear optical effect will not be obtained. When the composition is to be used in a non-linear device, the amount of particles is selected to enhance the third-order non-linear optical effect.

In this invention, due to dispersion of the aforementioned conductor and/or semiconductor particles in the polysilane, a polarized condition of the particles in the polysilane is produced in response to surface plasmon absorption by the conductor particles or excitons generated in the semiconductor particles on irradiation with light. Furthermore, this polarized condition of the particles is stabilized in the polysilane since this is a functional organic polymer having a comparatively large dielectric constant. As a result, there is a large change in refractive index due to the interaction between the particles in polarized condition and the electrons of the polysilane. A polysilane composition of very superior non-linear optical characteristics can thereby be obtained, wherein the value of $\chi^{(3)}$ is about $10^{-10}$ esu or more, and the value of $\chi^{(3)}/\alpha$ is more than about $10^{-12}$ esu (where $\alpha$ represents the absorbance).

The polysilane composition of the invention may be produced by any desirable manner. Typically, first a polysilane thin film, preferably a polysilane monomolecular film, is formed on a substrate by the method of spin coating, or the Langmuir-Blodgett (LB) method or the like. Next, a film of the polysilane composition is directly formed on the substrate by repeating the step of sputtering or evaporating conductor or semiconductor particles onto this polysilane thin film and the step of forming the polysilane thin film.

Alternatively, a polysilane thin film is formed on a substrate, then conductor or semiconductor particles are sputtered or evaporated onto this polysilane thin film, then, if required, a polysilane thin film is again formed on top of this. The polysilane composition is then prepared in solution by dissolving the polysilane thin film on the substrate in a solvent and stirring. In this case, the solvent can then be removed from the solution by distillation and reprecipitation or the like as necessary.

Further according to this invention, a polysilane composition of this invention can be directly obtained in a solution of the polysilane. This is most effectively accomplished if the conductor or semiconductor particles are dispersed in a polysilane having amphiphilic properties, obtained by introducing hydrophilic groups or linkages as described above into its side chains. In more detail, initially a mixed solution of the polysilane and particle starting material such as a metal salt is prepared, and the particles are deposited by chemical reaction by a method such as reduction of this starting material in the solution. A film of the composition is then formed by such methods as solvent removal and reprecipitation of the particles or concentrating a dispersion onto an electrode by electrophoresis. Or an electrolysis reaction may be performed using an electrode coated with a porous film of polysilane. In such ways, the particles can be electrochemically deposited into the polysilane and the polysilane composition of this invention can thereby be prepared.

Next, a non-linear optical device according to this invention will be described with reference to the drawing.

FIG. 1 is a perspective view showing an example of a non-linear optical device according to this invention. As shown in the drawing, in this example, the non-linear optical device is obtained by forming optical waveguides 5, 6 and 7 on the output side, and optical waveguides 3 and 4 on the input side of the periphery of a core 2. Core 2 is formed of the polysilane composition described above and is arranged on a substrate 1 comprising, for example, quartz, glass, silicon, or the like. Core 2 is composed of a film comprising the polysilane composition described above wherein the thickness of the film is preferably more than about 0.4 μm and even more preferably more than about 1 μm. The reason for the preferred thickness is that if the thickness of the film is too thin, it is difficult to guide a light beam into the core 2.

Furthermore, in general, a cladding layer 8 of different refractive index from the optical waveguide complex is provided at the periphery of the optical waveguide complex comprising core 2 and optical waveguides 3, 4, 5, 6 and 7. Alternatively, in a non-linear optical device according to the invention, the entire optical waveguide complex could consist of a core formed of the polysilane composition. If the refractive index of the optical waveguide complex is greatly different than that of, for example, air, the cladding layer at the periphery of the optical waveguide complex may be eliminated.

It should be noted that if optical waveguides 3, 4, 5, 6 and 7 are formed of a polysilane or polysilane composition, a polysiloxane cladding layer 8 can easily be provided as shown below. In consequence, a non-linear optical device can be produced in a very straightforward way.

Specifically, the polysilane is transparent to light in the visible region and is easily oxidized by irradiation with ultraviolet light in an atmosphere containing oxygen, producing a siloxane compound of a different refractive index. Consequently, if, for example, a thin film of a polysilane or polysilane composition is formed over the entire surface of substrate 1 and prescribed regions are then exposed to ultraviolet light through a mask, the unexposed portions will form core 2 and optical waveguides 3, 4, 5, 6 and 7 whose main constituent is a polysilane, whereas the exposed portions can form a cladding layer 8 whose main constituent is a siloxane compound. Moreover as a result of the mutual interaction between polysilanes and plasmons or excitons generated by irradiation with light the main chain of polysilanes will be excited and the reactivity of polysilanes will be enhanced. Thus, polysilanes can be more easily volatilized or decomposed, and their crystalline form, conformation, and the like can be altered more easily by irradiating at a lower energy than that required to excite polysilane α-electrons. In consequence, patterns or waveguides of the polysilane composition may also be easily constructed.

Further according to this invention, preferably core 2 is strengthened by using a cross-linking agent to harden the polysilane in core 2 with cross-linkage in two or three dimensions. Any desired polysilane crosslinkers can be used. In this case, a multi-functional compound such as an epoxide, an acid chloride, an acid anhydride, an isocyanate, an alkoxysilane, and the like can be used as the cross-linking agent.

In order to operate the non-linear optical device shown in FIG. 1, laser light from a laser light source, not shown, which is capable of being modulated, is input to optical waveguides 3 and 4 through optical fiber 9. If a laser beam is respectively independently input to optical waveguide 3 or 4, such laser beam would be respectively output unmodified from optical waveguide 5 or 6. In contrast, if laser beams are simultaneously input to optical waveguides 3 and 4, since the optical axes of the two laser beams intersect in core 2 formed of the polysilane composition, due to the excellent non-linear optical characteristics possessed by the polysilane composition, an electronic lattice is formed at the point of intersection of the optical axes of the two laser beams. Consequently, for example, the laser beam that is input to optical waveguide 3 is diffracted by this electronic lattice on its passage through core 2, with the result that a diffracted beam is output from optical waveguide 7 and can be detected by a photodetector, not shown.

Specifically, in the non-linear optical device shown in FIG. 1, when light is simultaneously input to optical waveguides 3 and 4, diffracted light is output from optical waveguide 7. However, if no light is input to optical waveguide 4, the light that is input to optical waveguide 3 cannot be diffracted. The light is therefore output only from optical waveguide 5 and no diffracted light is output from optical waveguide 7. Desirable application as an optical switching device can thus be achieved wherein light is constantly input to optical waveguide 3 and ON/OFF switching of the output light from optical waveguide 7 is performed by ON/OFF control of the light input to optical waveguide 4. Also as described above, since light is output from optical waveguide 7 only when light is simultaneously input to optical waveguides 3 and 4, no light is output from optical waveguide 7 when light is input solely to either one of optical waveguides 3 and 4. Thus the device can be used as an AND gate or circuit to output a signal when light is incident upon both waveguides 3 and 4 by providing a photodetector to detect the output light from optical waveguide 7. In addition, apart from this, the non-linear optical devices of this invention have application potential in phase conjugate mirrors, ultrafast spectroscopy, transient holograms and code modulators and the like.

Furthermore, the polysilane composition of this invention can be used in an electric device for detection, an optical fiber, a chemical or optical sensor, and a catalyst, as well as use for the non-linear optical devices described above.

Embodiments of this invention are described in detail below. It should be noted that these embodiments are provided simply to facilitate understanding of the invention and are not to be considered as restricting the invention.

EXAMPLE 1

A varnish of the polysilane composition of this invention was prepared by forming polysilane thin film represented by the formula (II) given below on a quartz substrate by the spin coating method in a thickness of 50 nm, followed by sputtering gold particles onto this polysilane film, then dissolving in toluene solvent the polysilane thin film with the gold particles adhering and stirring. It was confirmed, using a transmission electron beam microscope, that in this polysilane composition gold particles of particle size 20–50 Å were dispersed in the polysilane in the amount of 8 volume % based on that of the polysilane.

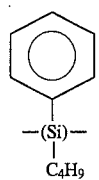

(II)

(weight average molecular weight: 9,000)

Next, the varnish of the polysilane composition as described above was applied by the spin coating method onto a quartz substrate and dried. The third-order non-linear optical constant for this thin film of the polysilane composition which was obtained was then determined by the method of degenerate four-wave mixing (DFWM). As a result it was found that $\chi^{(3)}=7.8\times10^{-10}$ esu. For reference, $\chi^{(3)}=4.2\times10^{-12}$ esu was the value obtained when the third-order non-linear optical constant was likewise determined for the polysilane thin film of general formula given above. From this it can be seen that with the polysilane composition of this invention excellent non-linear optical characteristics are obtained by dispersal of particles as described above in the polysilane.

EXAMPLE 2

30 ml of a methanol solution of 39 mg of palladium chloride (II) and 30 ml of an ethanol solution of 4.5 mg of sodium borohydride as a reducing agent were added dropwise to 20 ml of an ethanol solution of 10 mg of the polysilane represented by the formula (III) given below, while stirring. As the drops were added, a black cloudy colloidal solution was obtained by deposition of palladium. Next the solution was concentrated by distilling off the solvent. The colloidal solution was then gradually added dropwise into a large quantity of water, producing a precipitate, which was filtered off and dried to obtain the polysilane composition of this invention. It was confirmed by a transmission electron beam microscope that particles of palladium of particle size 80–150 Å were dispersed in this polysilane composition in the amount of 7 volume % based on that of the polysilane.

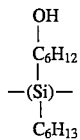

(III)

(weight average molecular weight: 50,000)

Next, a varnish was prepared by dissolving the polysilane composition described above in ethanol. This varnish was applied by the spin coating method onto a quartz substrate and dried to obtain a thin film of the polysilane composition, whose third-order non-linear optical constant was then determined by the method of degenerate four-wave mixing. As a result, it was confirmed that it had excellent non-linear optical characteristics with $\chi^{(3)}=8.5\times10^{-10}$ esu.

EXAMPLE 3

Varnish of the polysilane composition of this invention was prepared in the same way as in Example 1 with the exception that CdS particles were sputtered onto the thin film of the polysilane instead of sputtering gold particles. On observation using a transmission electron beam microscope it was found that in the varnish of the polysilane composition obtained CdS particles of particle size 20–50 Å were dispersed in the polysilane composition in the amount of 20 volume % based on that of the polysilane.

Next, a varnish of the polysilane composition described above was applied by the spin coating method onto a quartz substrate and dried to obtain a thin film of the polysilane composition, whose third-order non-linear optical constant was then determined by the method of degenerate four-wave mixing. As a result, it was confirmed that it had excellent non-linear optical characteristics with $\chi^{(3)}=2.3\times10^{-8}$ esu.

EXAMPLE 4

2 ml of a mixed solution of 10 ml of 35 weight % formalin as reducing agent and 95 ml of a 2N aqueous solution of potassium hydroxide was added dropwise while stirring at room temperature to 100 ml of a dimethyl formamide solution of 15 mg of the polysilane represented by the formula (IV) given below and 5 mg of gold trichloride. Next, after stirring for about one minute at room temperature, 30 ml of water was added dropwise and stirred for about 5 minutes. Next, 4 g of sodium chloride were added and stirring was again performed at room temperature. The precipitate produced was filtered off, washed with water, and dried under vacuum to obtain 7 mg of the polysilane composition of this invention. This polysilane composition had a purple color. It was confirmed by a transmission electron beam microscope that particles of gold of mean particle size 70 Å were dispersed in this polysilane composition in the amount of 5 volume % based on that of the polysilane.

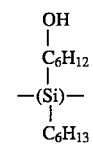

(IV)

(weight average molecular weight: 200,000)

Next, varnish was prepared by dissolving the polysilane composition described above in dimethyl formamide, applying this varnish to a quartz substrate and drying to form a cast film of film thickness 2 μm. Next, hardening treatment was performed by exposure to formaldehyde vapor as a cross-linking agent and hydrogen chloride vapor as a catalyst, by maintaining this cast film in the vicinity of formalin and hydrochloric acid in a container isolated from the external atmosphere.

When the third-order non-linear optical constant of the polysilane composition obtained was determined using the method of degenerate four-wave mixing and using a laser beam of wavelength 560 nm as light source, $\chi^{(3)}=1.2\times10^{-8}$ esu, and $\chi^{(3)}/\alpha=10^{-11}$ esu-cm (where α represents the absorbance) were obtained. Furthermore, it displayed a fast non-linear response, with a switching speed of about $7\times10^{-14}$ sec. Thus, excellent non-linear optical properties were obtained. For reference, on likewise measuring the third-order non-linear optical constant of a hardened film of the polysilane represented by above general formula, $\chi^{(3)}=3.7\times10^{-12}$ esu, and $\chi^{(3)}/\alpha=10^{-13}$ to $10^{-12}$ esu-cm were found. Thus it was confirmed that excellent non-linear optical properties were obtained with the polysilane composition of this invention due to the dispersal in the polysilane of particles as described above.

A cast film was prepared exactly as above except that its film thickness was made 20 μm. Then, part of this film was exposed to illumination of 7 mw/cm²×3 minutes provided by a high-pressure mercury lamp. The refractive indices of this exposed portions and the unexposed portions were measured and were respectively found to be 1.46 and 1.62. It was thereby confirmed that an optical waveguide complex and cladding layer of mutually different refractive indices can easily be formed with a thin film of the polysilane composition as described above by exposing prescribed regions to light.

Further in this embodiment, an optical switching device was produced as shown in FIG. 1 using this polysilane composition. Specifically, first, all except the central part of a cast film exactly as above except that the film thickness was made 100 μm, was exposed through a mask to a high-pressure mercury lamp under 7 mw/cm$^2$×3 minutes. Next, the exposed portions were removed with an aqueous solution of 2.38 weight % of tetramethyl ammonium hydroxide. The film was then subjected to hardening treatment by exposure to formaldehyde vapor as a cross-linking agent and hydrogen chloride vapor as a catalyst, by maintaining this cast film in the vicinity of formalin and hydrochloric acid in a container isolated from the external atmosphere. In this way, a core was formed on a quartz substrate. Next, toluene solution of the polysilane represented by general formula (V) given below (without containing conductor or semiconductor particles) was applied to the periphery of the core and dried to form a cast film of film thickness 40 μm destined to constitute the optical waveguide. Prescribed regions were exposed in air through a mask to a high pressure mercury lamp under 7 mw/cm$^2$×3 minutes to oxidize the polysilane. Thus the unexposed portions formed the optical waveguide while the exposed portions formed a cladding layer. Finally the entire surface had aqueous acrylic emulsion applied to it. This was then dried to form an upper cladding layer. An optical switching device was thereby obtained.

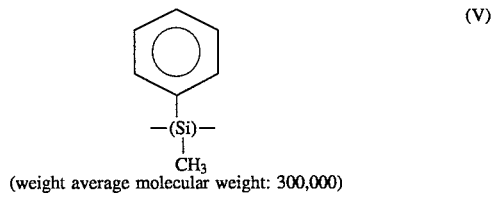

(V)

(weight average molecular weight: 300,000)

When operating tests of the optical switching device thus obtained were performed using a dye laser beam of wavelength 560 nm, it was found that it functioned well as an AND circuit.

Comparative Example 1

A varnish was prepared by dissolving poly-4-BCMU {poly-(6,7-dodecadiyne-1,12-diol-co-bis[((n-butoxycarbonyl)methyl)urethane])} in tetrahydrofuran. This varnish was applied onto a quartz substrate and dried. The third-order non-linear optical constant of the cast film obtained was then measured by the method of degenerate four-wave mixing, using as light source a laser beam of wavelength 560 nm. As a result, it was found that the non-linear optical properties were insufficient, with $\chi^{(3)}=10^{-10}$ esu, and $\chi^{(3)}/\alpha=10^{-12}$ esu-cm.

Next, a composition was obtained in which particles of gold were uniformly dispersed in poly-4-BCMU, by adding 100 ml of a gold colloidal solution in which 3 mg of gold were dispersed in acetone to 3 l of a tetrahydrofurane solution of 5 mg of poly-4-BCMU and mixing, then distilling off the solvent. It was confirmed by a transmission electron beam microscope that this composition contained 5 volume % of gold particles of particle size 50–200 Å dispersed in the poly-4-BCMU. Next, a varnish was prepared by dissolving the composition described above in tetrahydrofuran and this varnish was applied to a quartz substrate and dried. The third-order non-linear optical constant of the cast film obtained was then measured by the method of degenerate four-wave mixing. As a result, it was found that $\chi^{(3)}=9.2\times10^{-9}$ esu, and $\chi^{(3)}/\alpha=10^{-12}$ esu-cm, while the switching speed was on the order of $3\times10^{-11}$. That is, in the case of poly-4-BCMU, it was found that even a composition in which gold particles were dispersed never showed fully satisfactory non-linear optical properties.

As described in detail above, with this invention, a polysilane composition can be provided which has a large third-order non-linear optical constant and shows a fast non-linear response rate and thus has excellent non-linear optical properties. Also, using this polysilane composition a non-linear optical device equipped with an optical waveguide complex and a cladding layer can be manufactured in a very convenient way. This is of considerable industrial value.

TABLE A

| $C_3H_7$ | $C_4H_9$ | $C_5H_{11}$ |
|---|---|---|
| $(\text{Si})_n$ | $(\text{Si})_n$ | $(\text{Si})_n$ |
| H | $C_4H_9$ | $C_5H_{11}$ |
| | | |
| | | $CH_2$ |
| | | $CH_2$ |
| $C_6H_{13}$ | $C_6H_{13}$ | |
| $(\text{Si})_n$ | $(\text{Si})_n$ | $(\text{Si})_n$ |
| $C_6H_{13}$ | $CH_3$ | $CH_3$ |
| | $CH_3$ | |
| H | Ph | Ph |
| $(\text{Si})_n$ | $(\text{Si})_n$ | $(\text{Si})_n$ |
| $CH_3$ | $CH_3$ | $CH_3$ |
| $C_4H_9$ | | |
| Ph | Ph | |
| $(\text{Si})_n$ | $(\text{Si})_n$ | |
| $CH_3$ | $C_4H_9$ | |

(n: degree of polymerization)

TABLE B
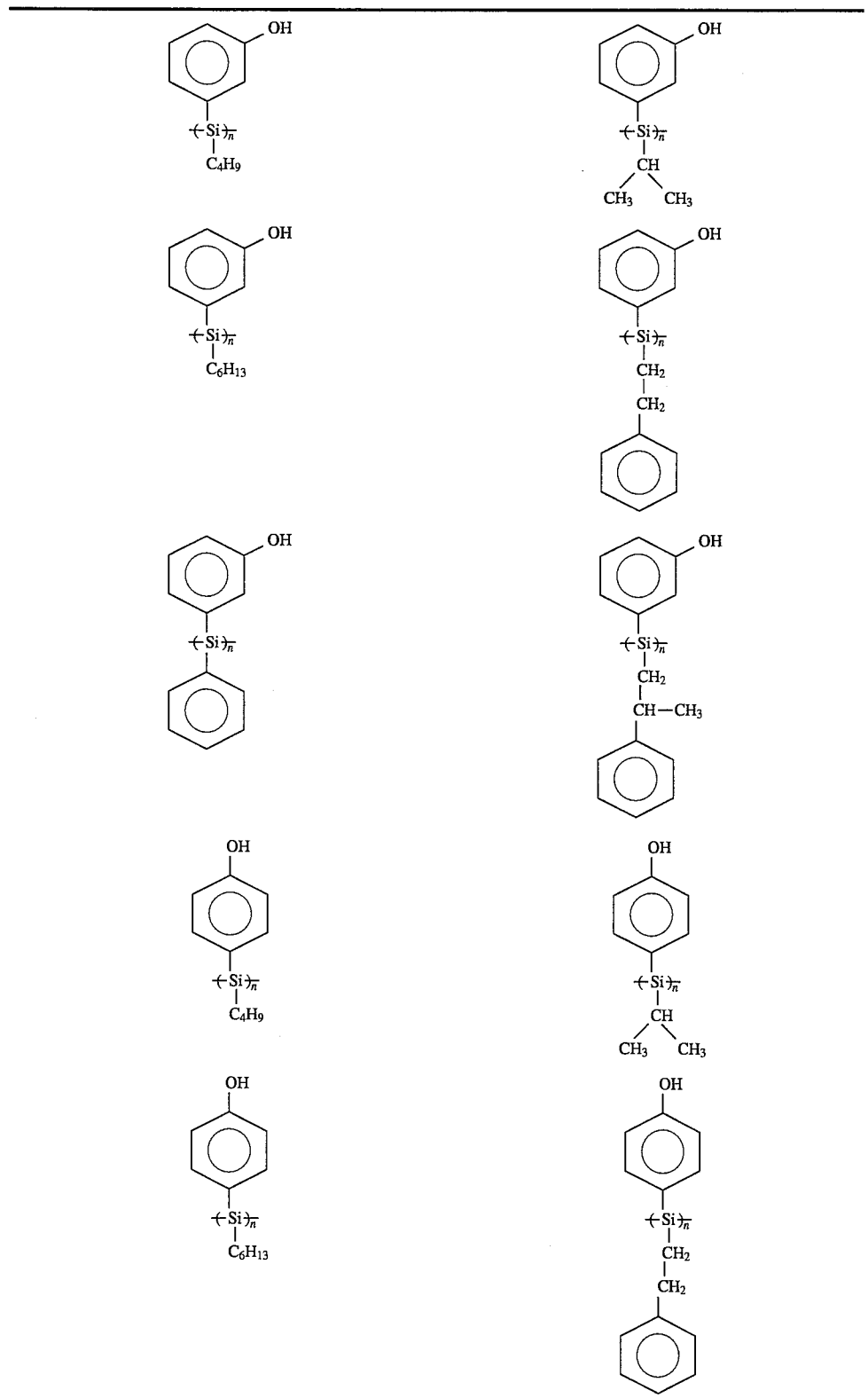

TABLE B-continued
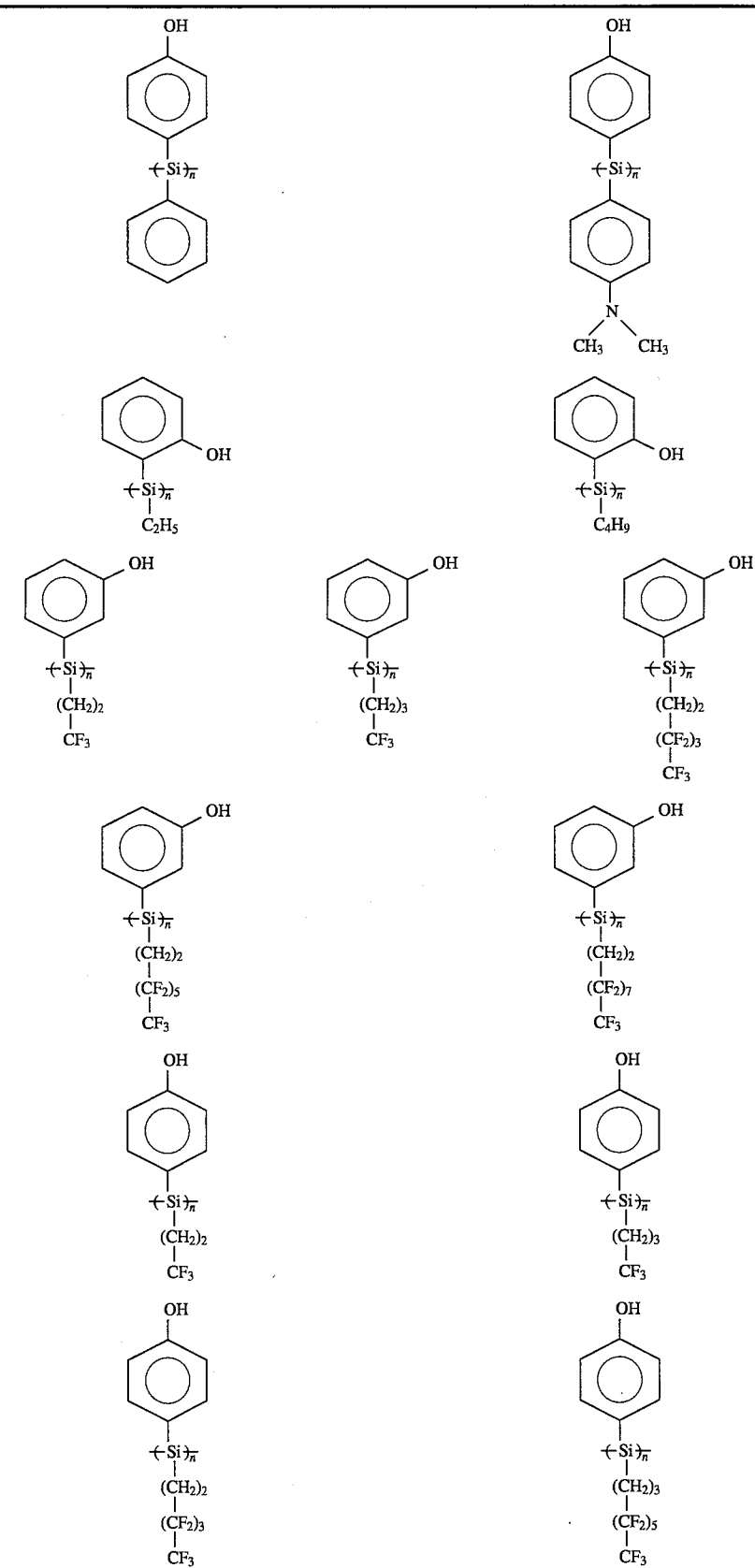

TABLE B-continued
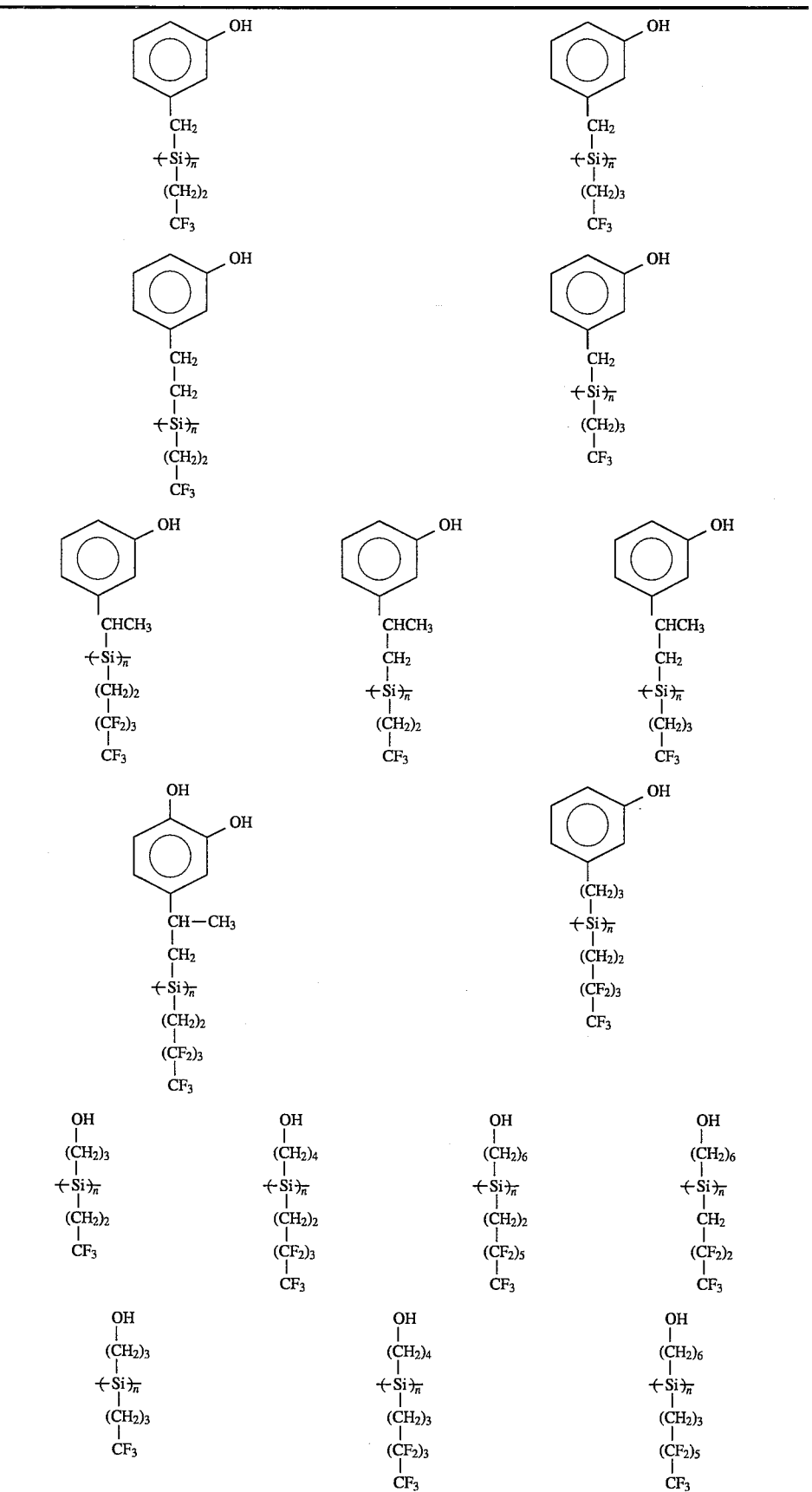

TABLE B-continued
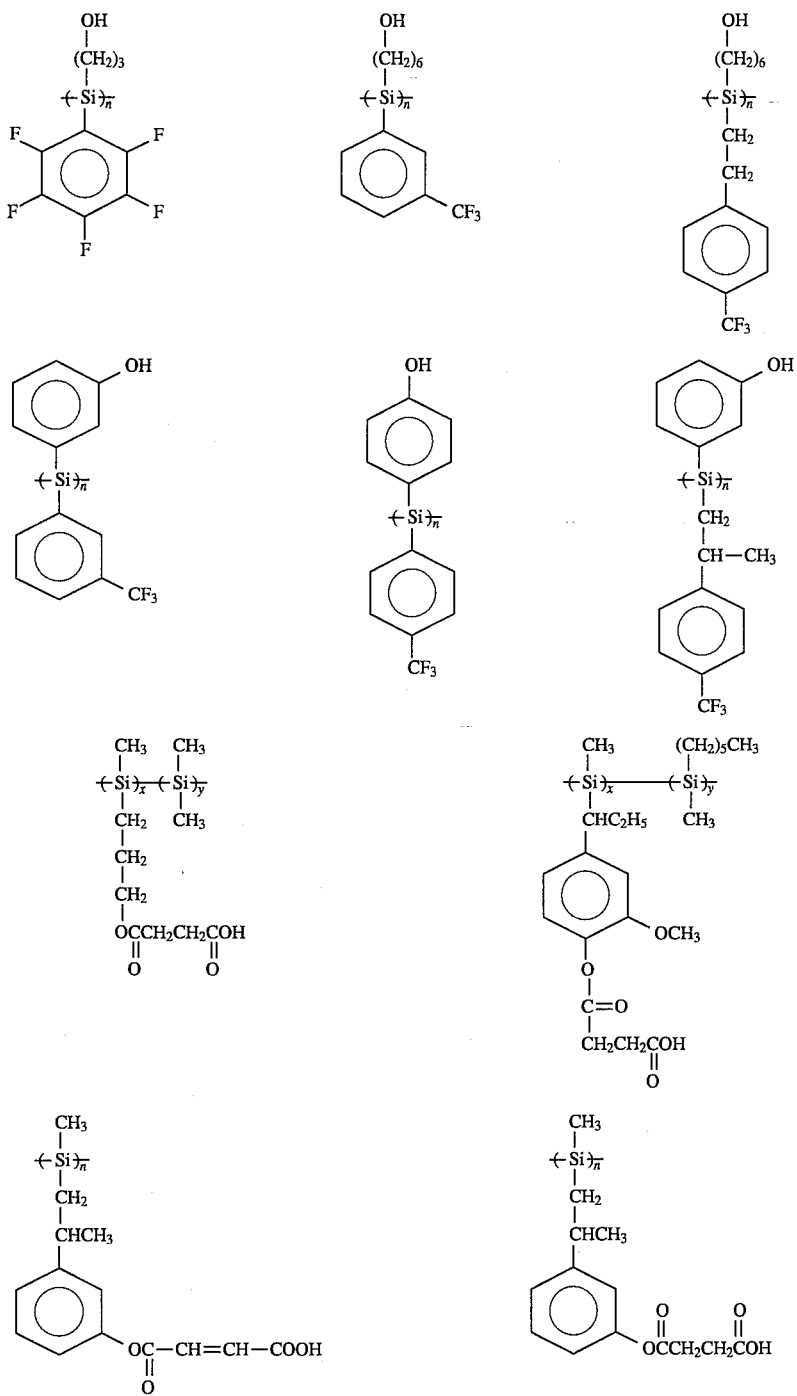

TABLE B-continued

TABLE B-continued
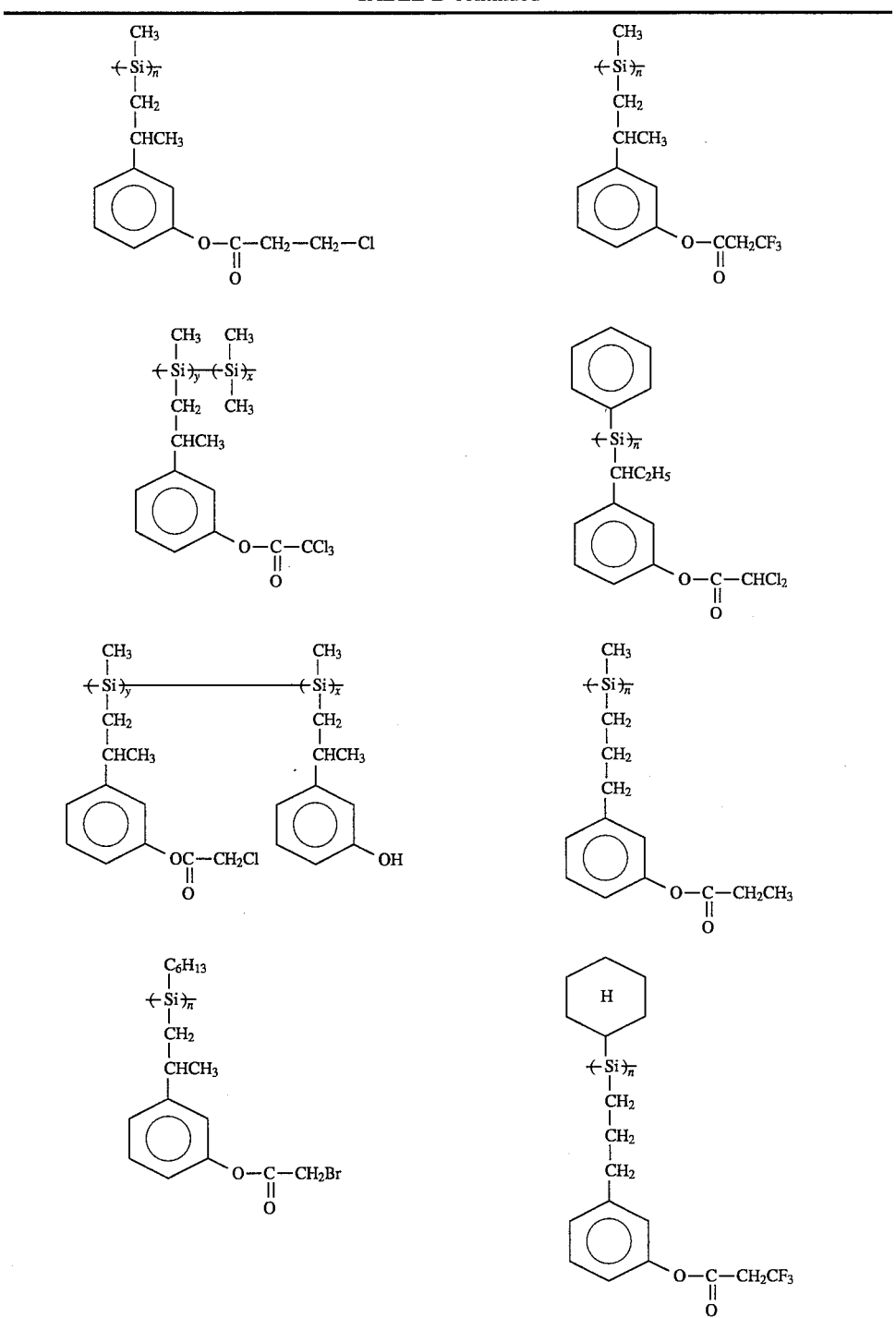

TABLE B-continued
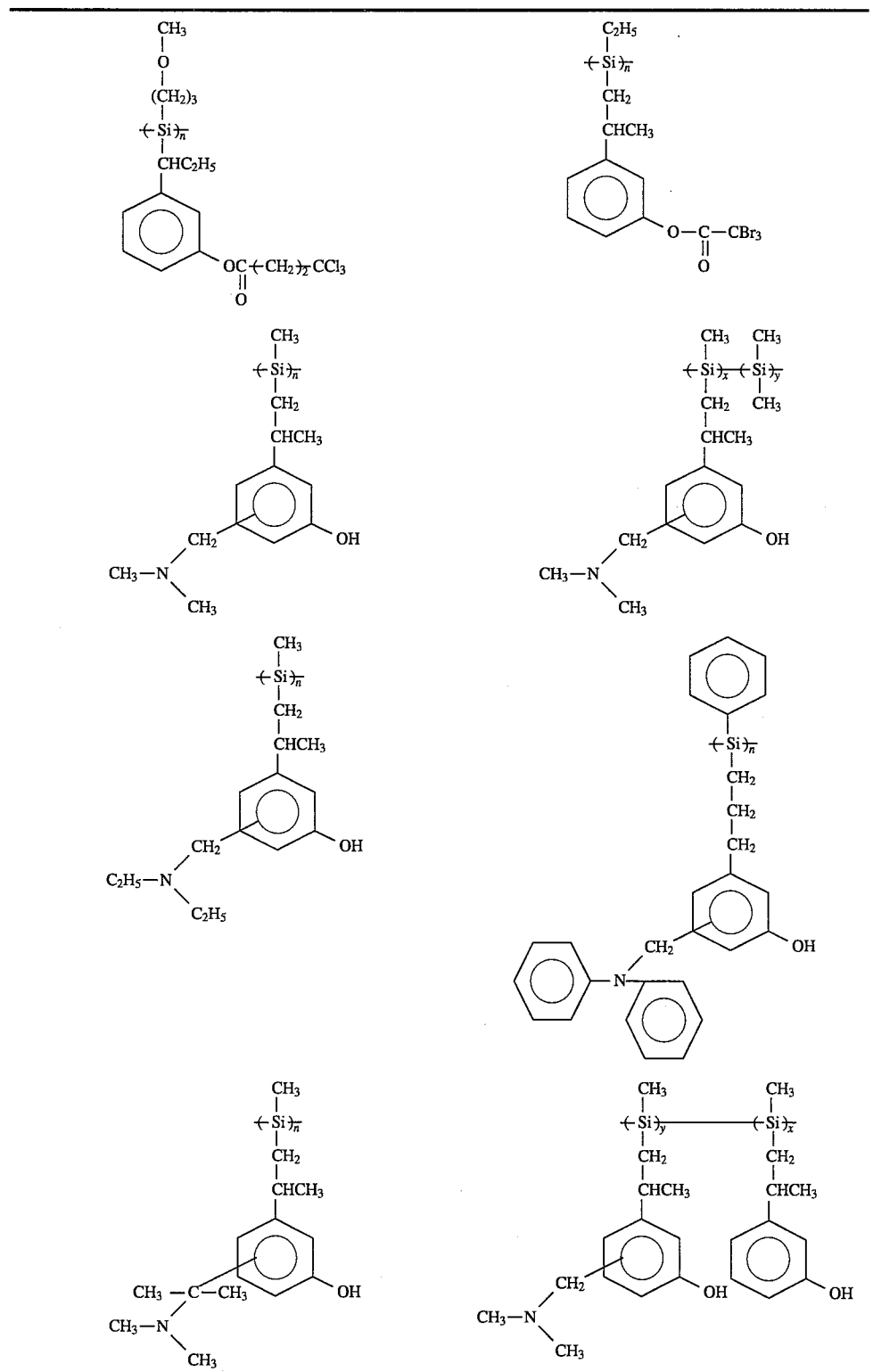

TABLE B-continued
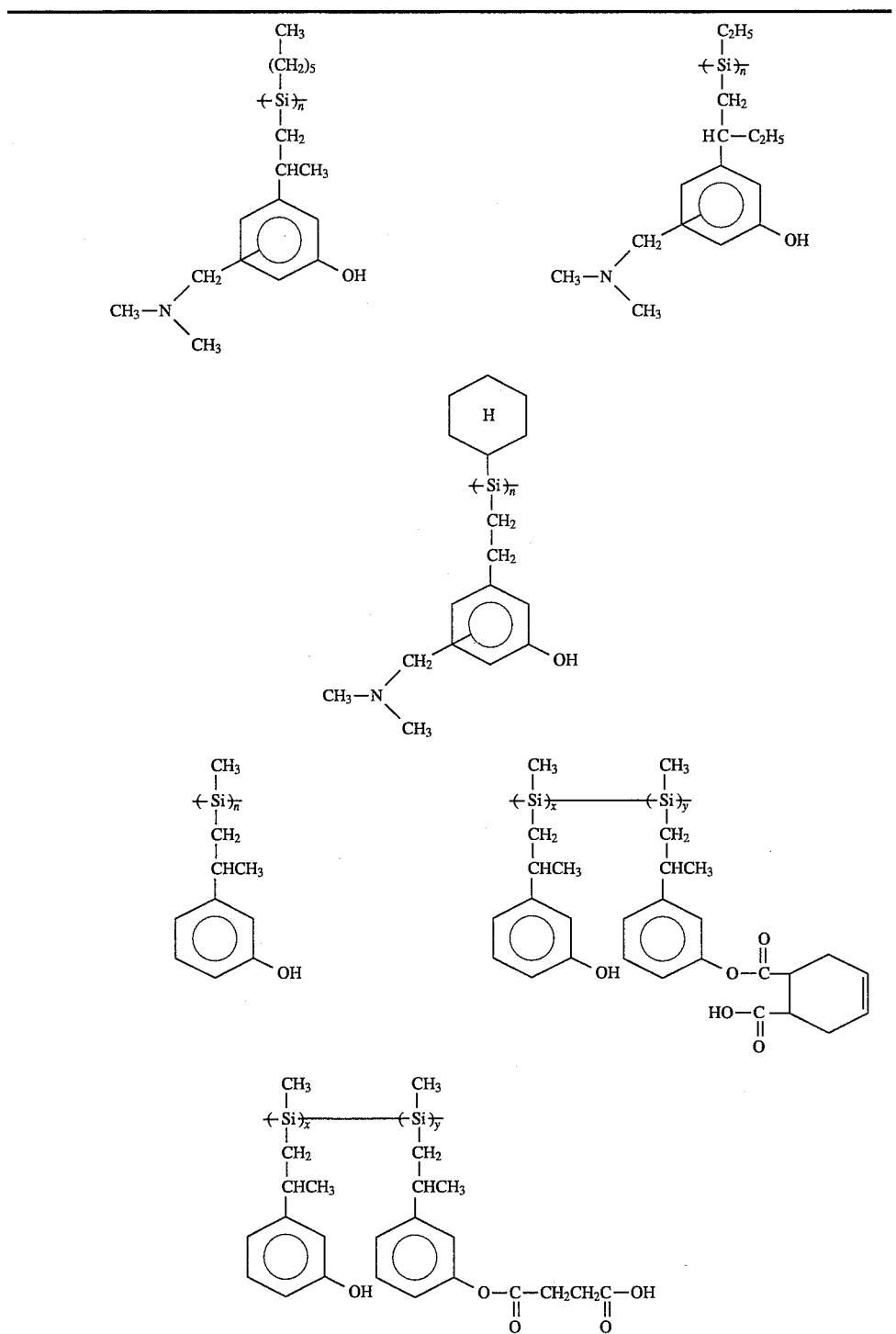

TABLE B-continued
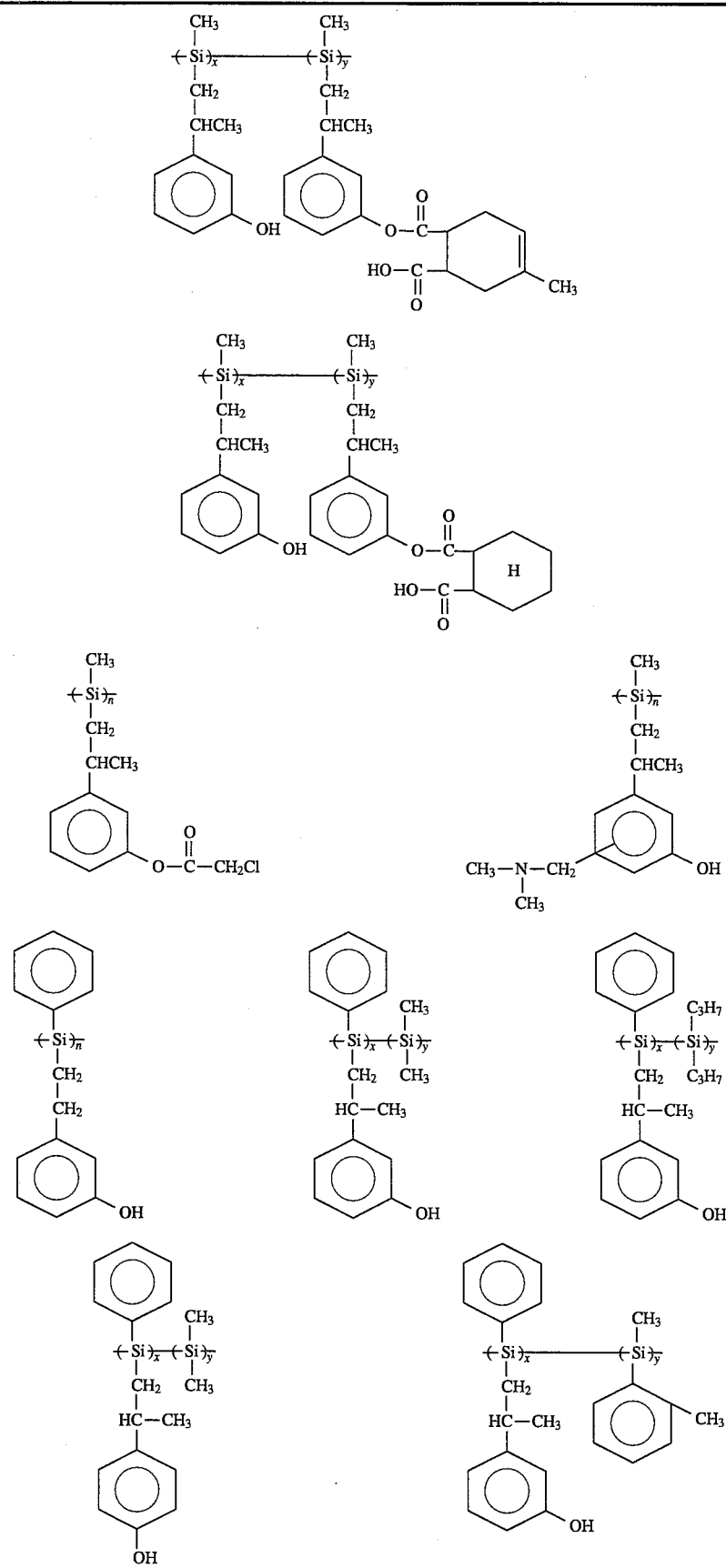

TABLE B-continued
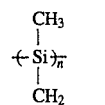
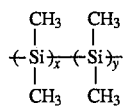
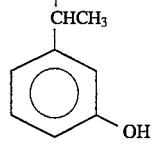
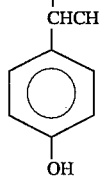
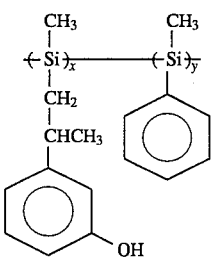
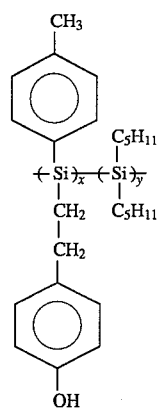
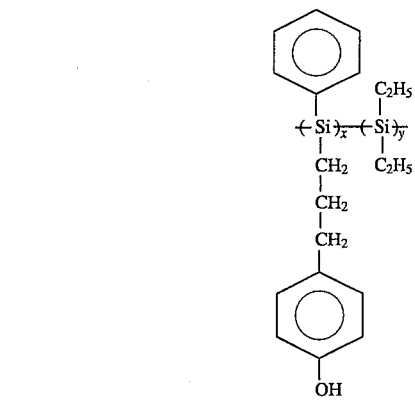
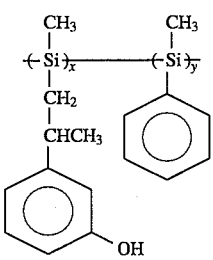
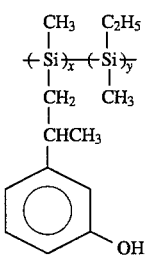
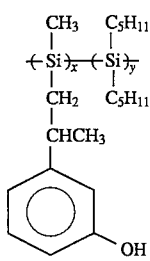

TABLE B-continued
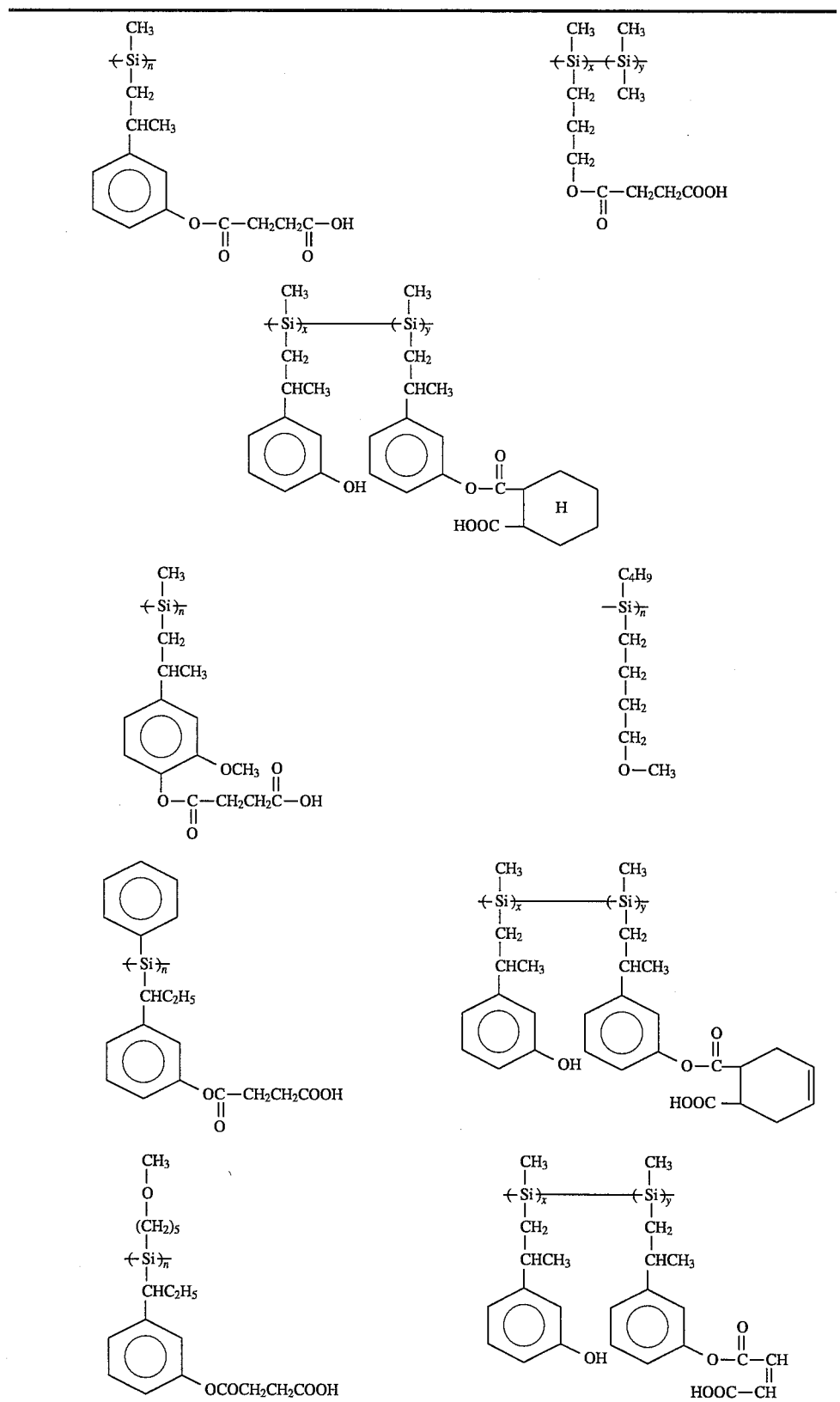

TABLE B-continued
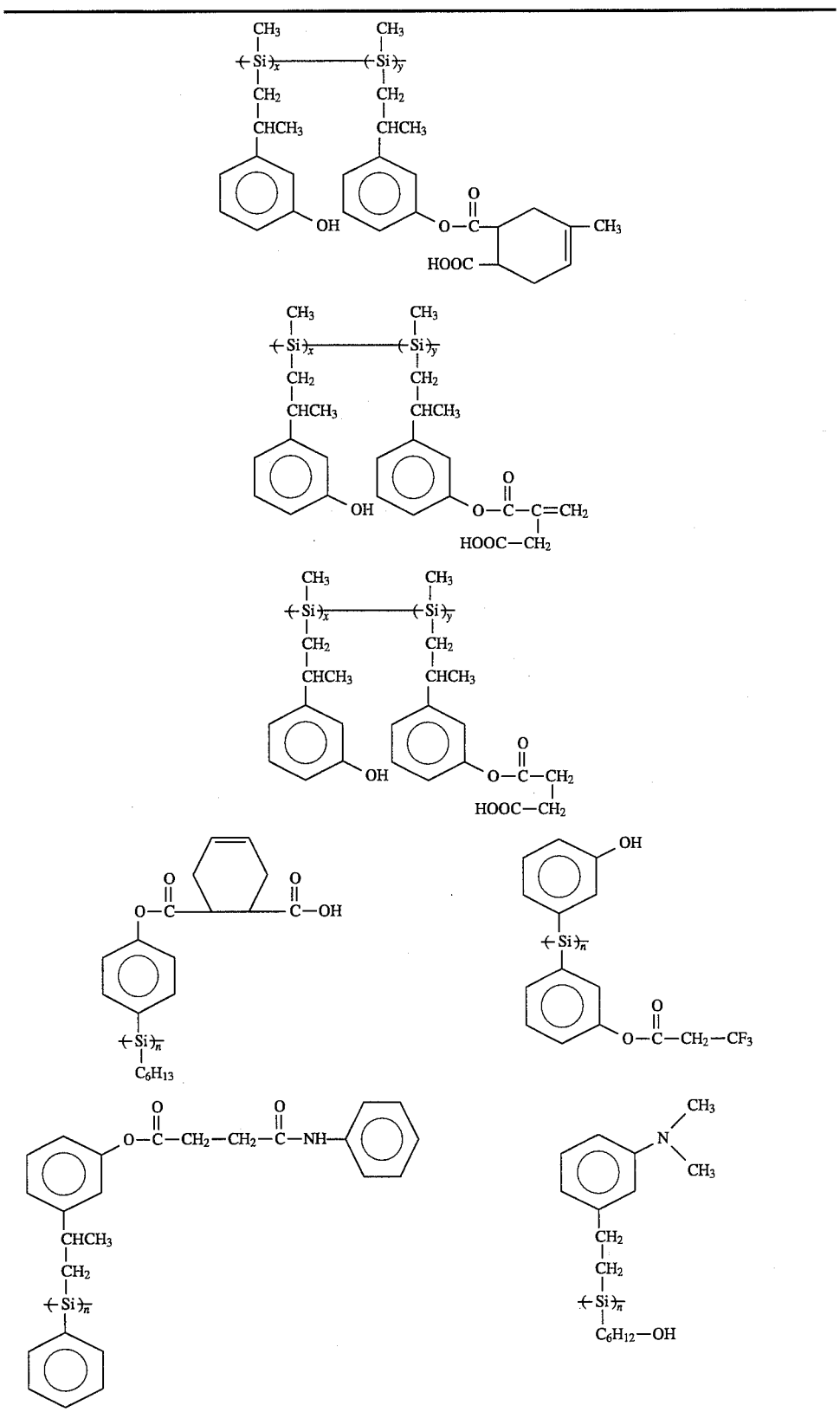

TABLE B-continued
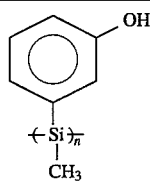 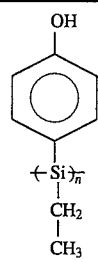
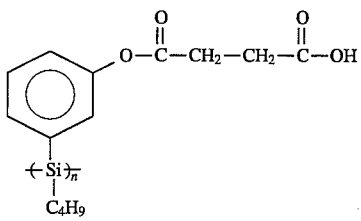 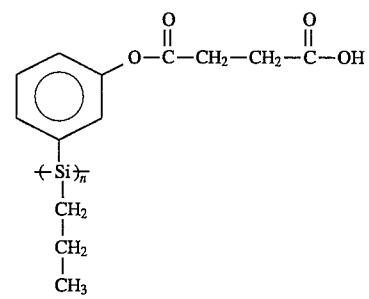
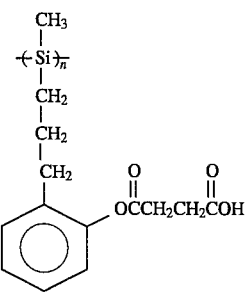 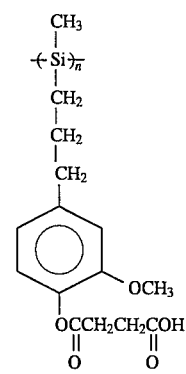
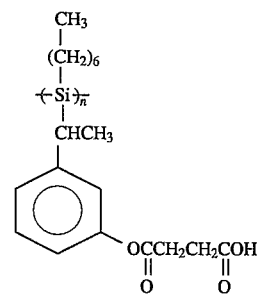
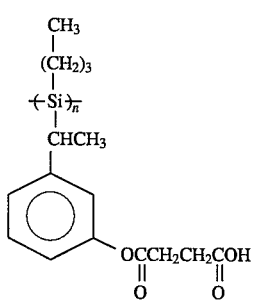 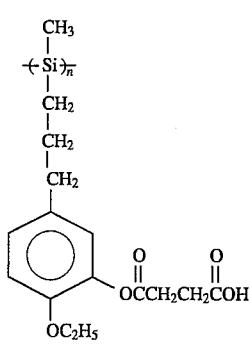

TABLE B-continued
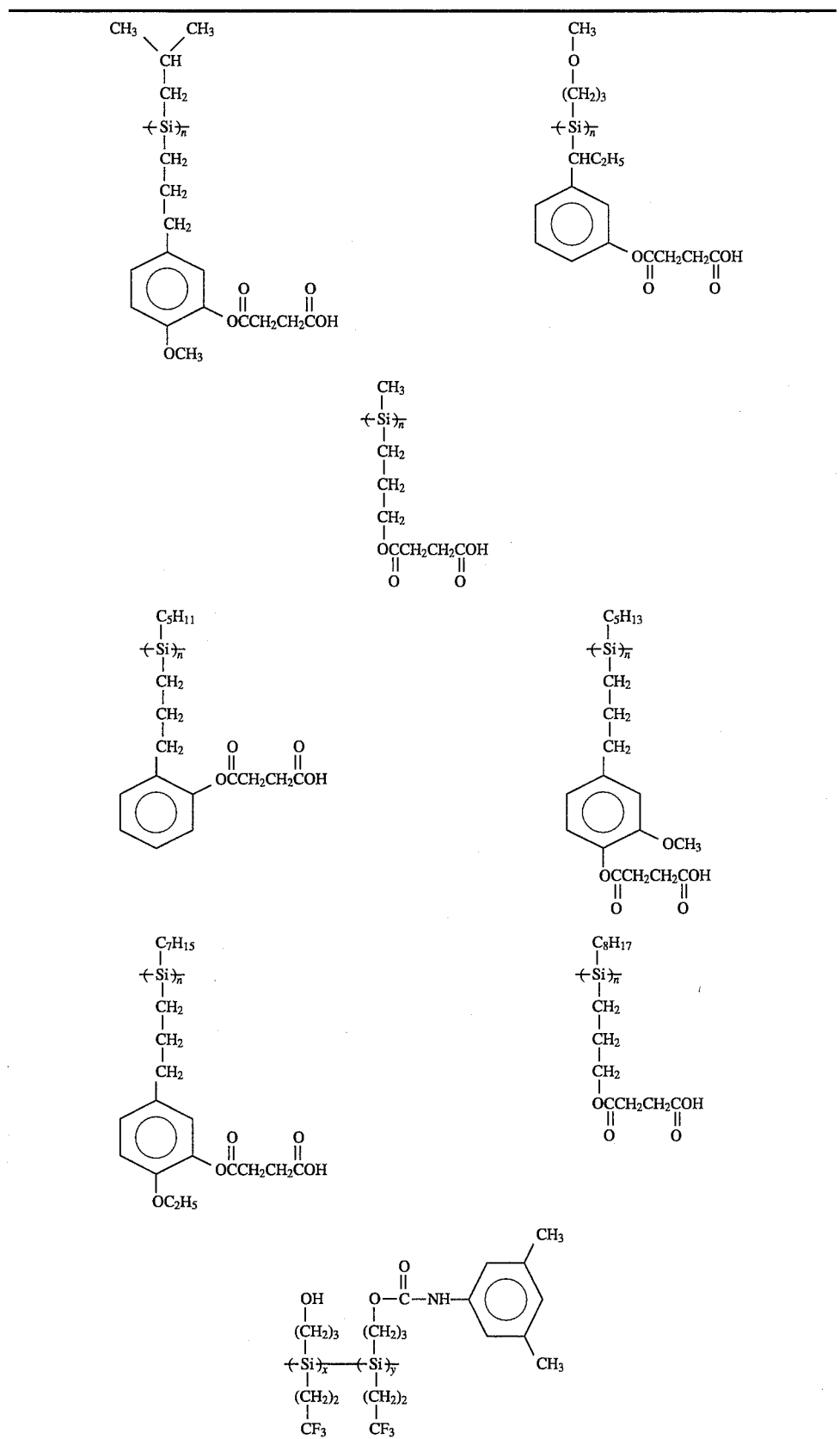

TABLE B-continued
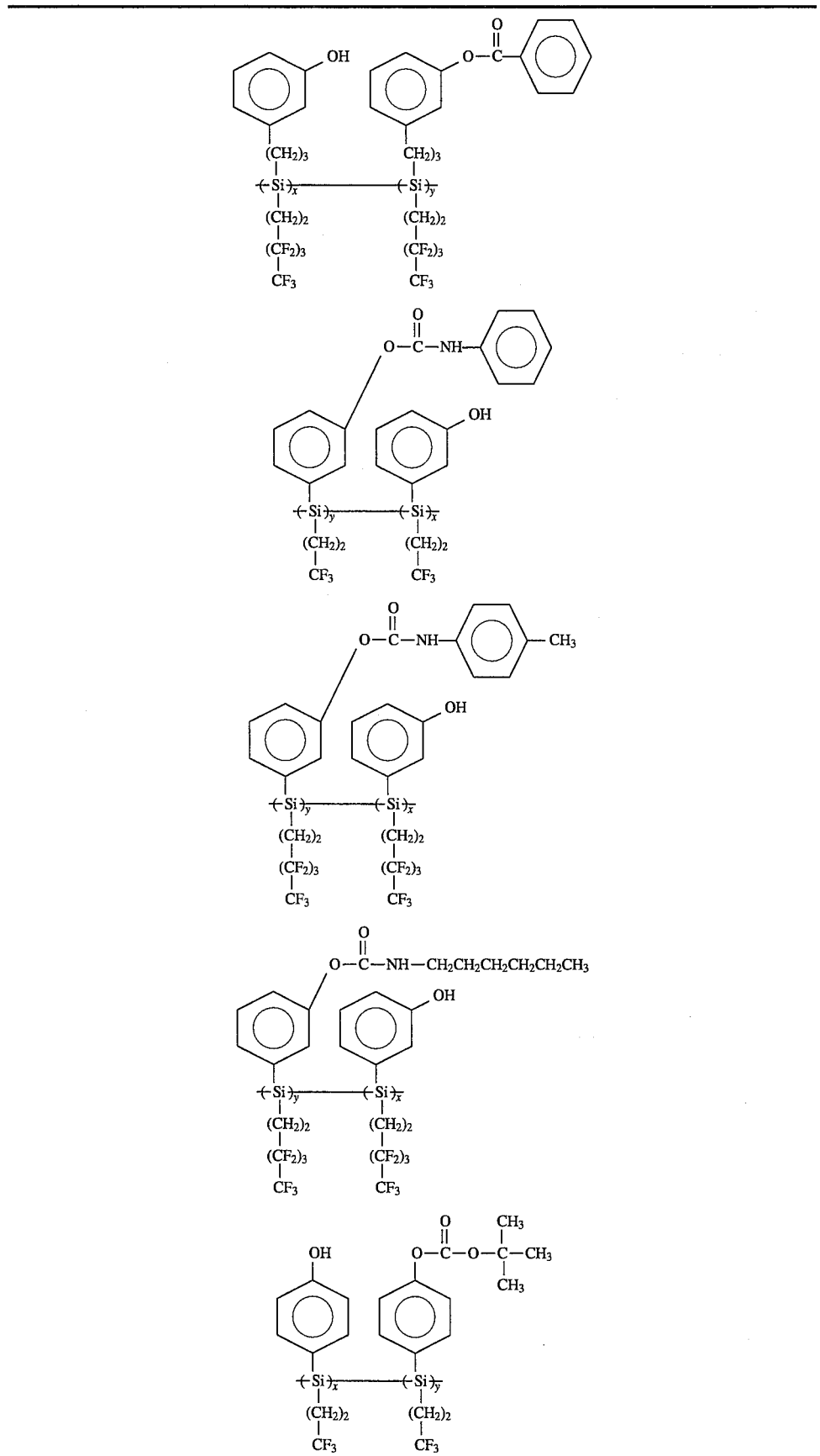

TABLE B-continued
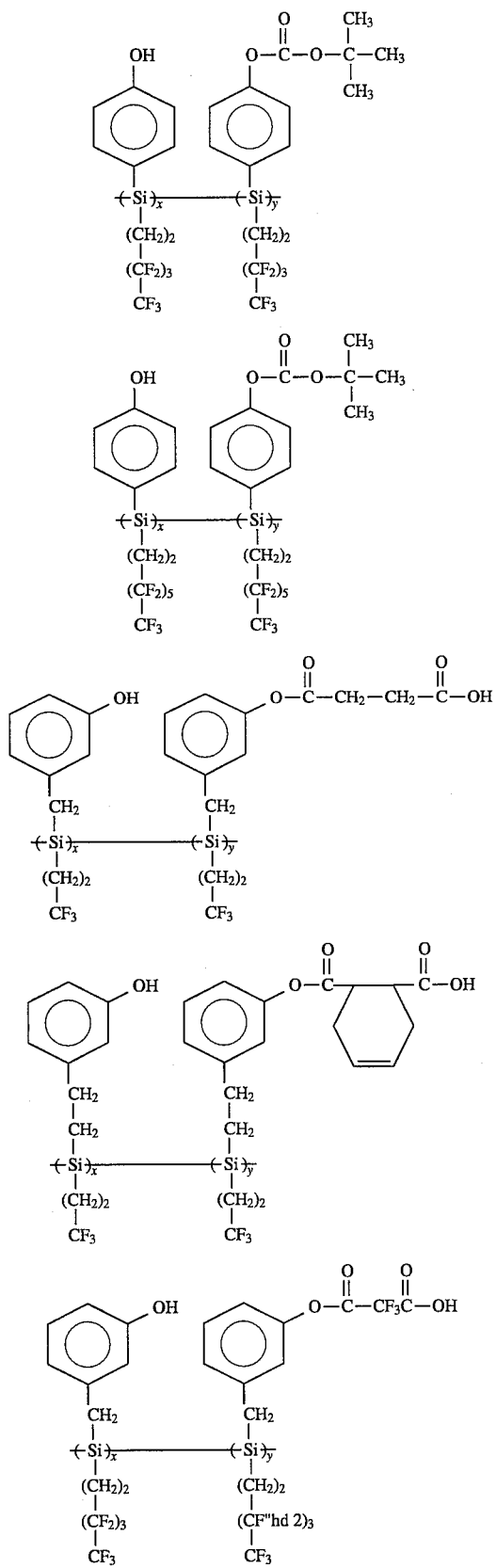

TABLE B-continued
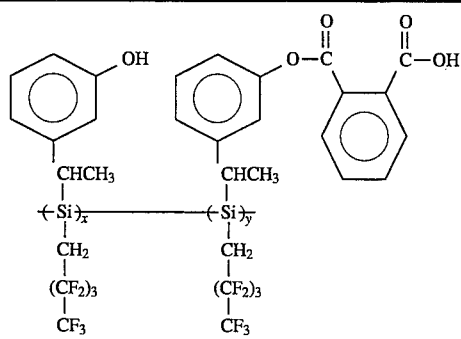
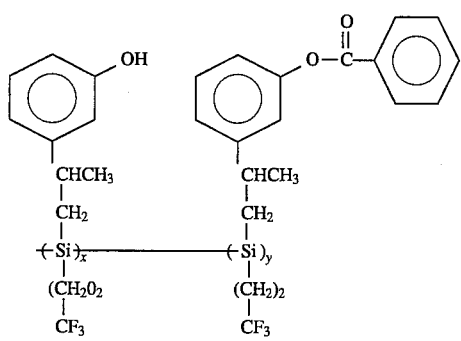
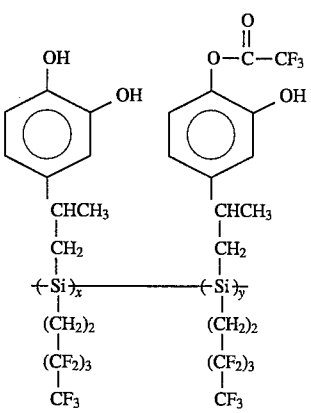
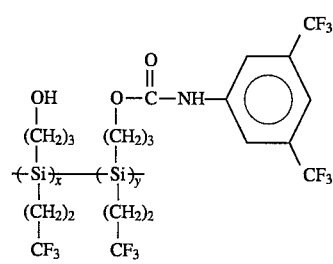
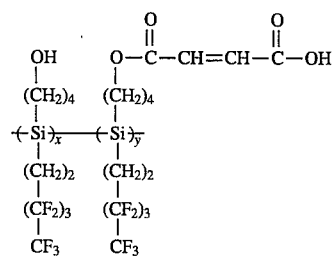

TABLE B-continued
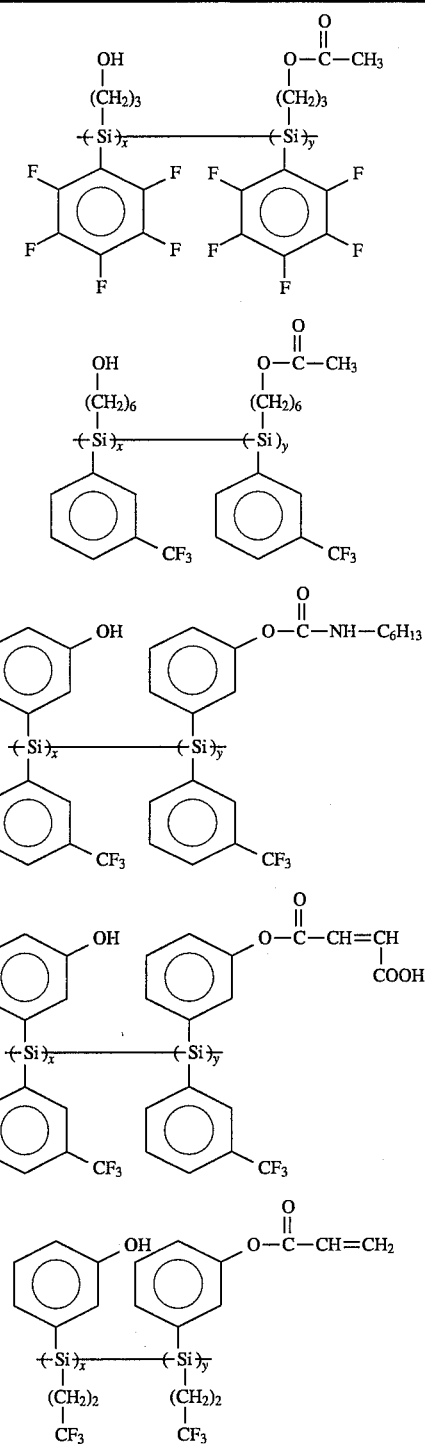

TABLE B-continued
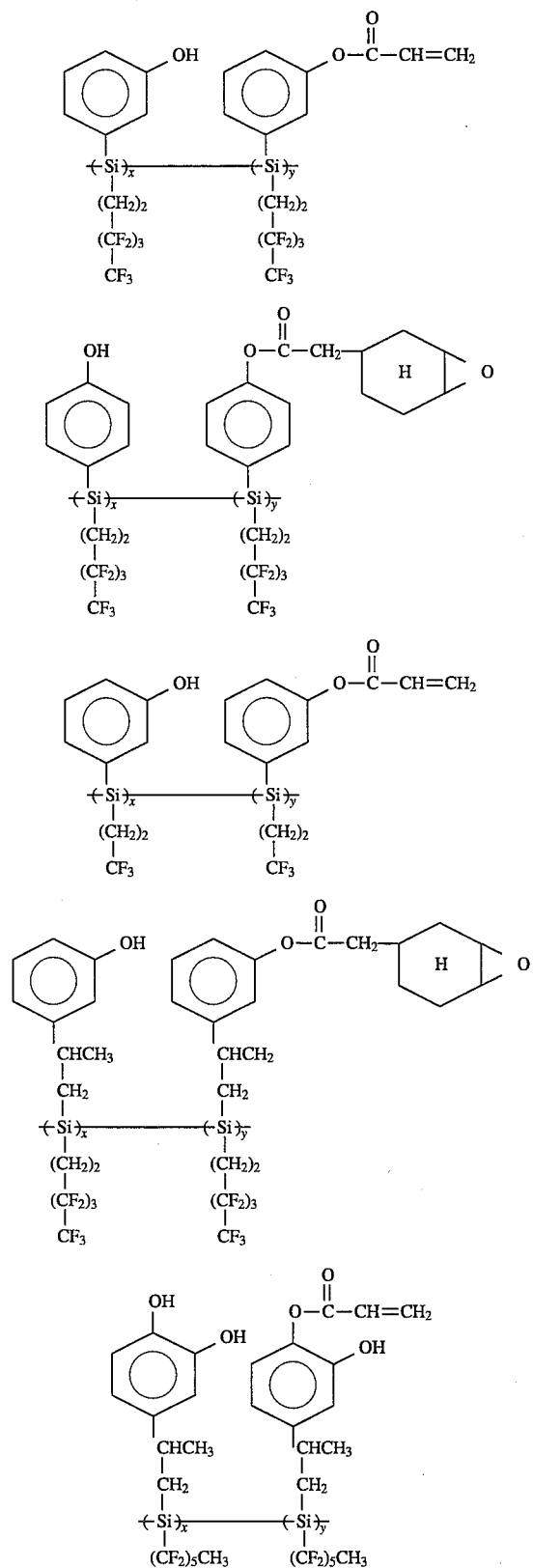

TABLE B-continued
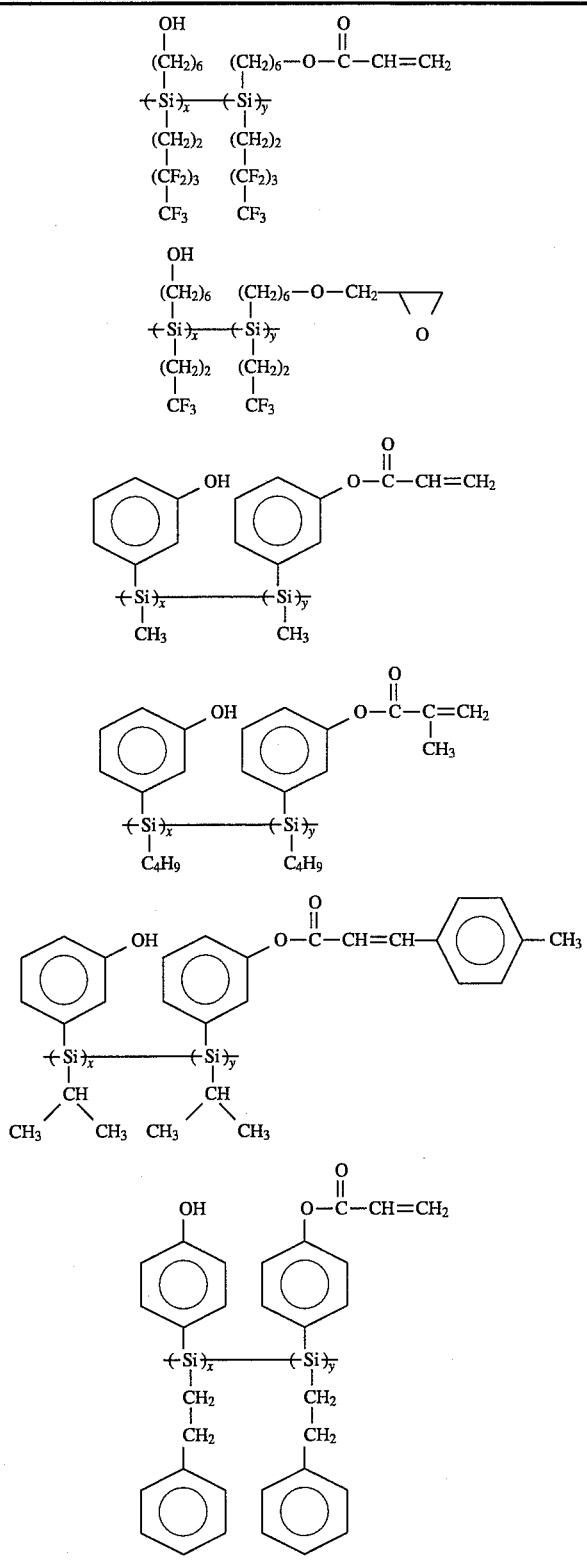

TABLE B-continued
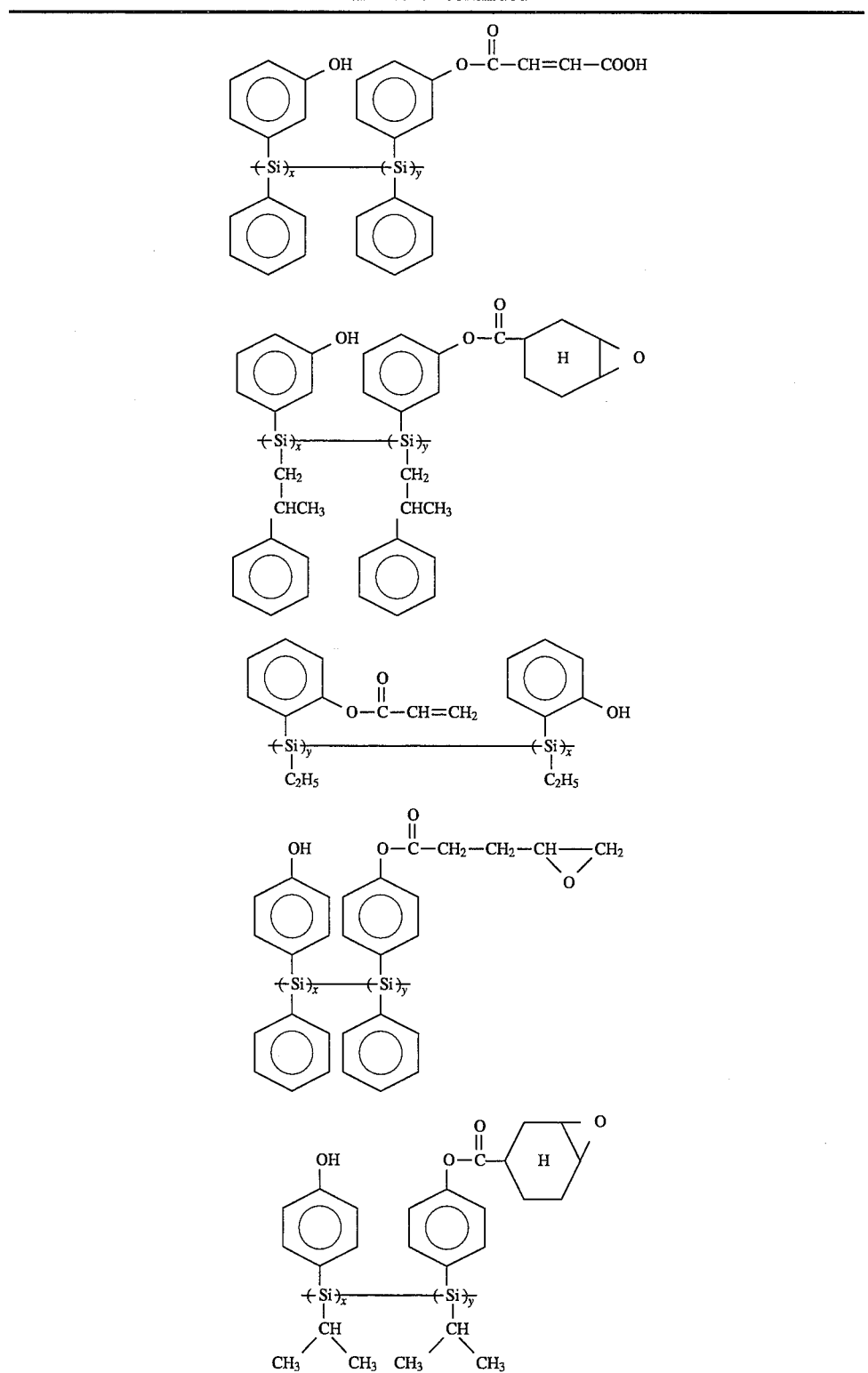

TABLE B-continued

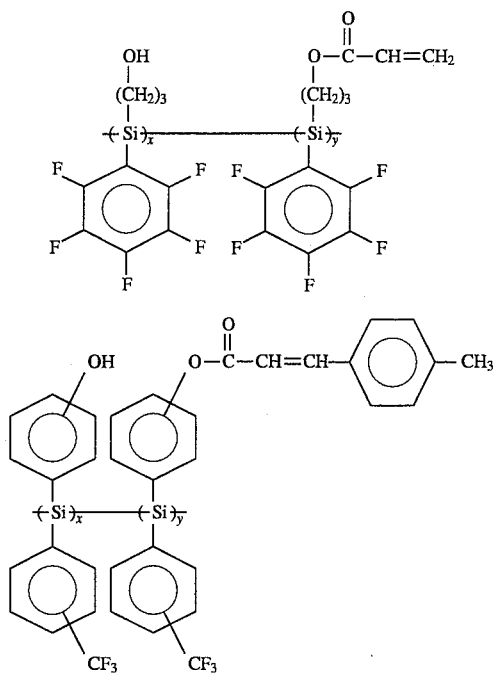

(n, x, y: degree of polymerization)

What is claimed is:
1. A polysilane composition comprising:
   (a) a polysilane having a repeating unit represented by formula (I)

$$-(Si)- \begin{array}{c} R^1 \\ | \\ | \\ R^2 \end{array} \quad (I)$$

where $R^1$ and $R^2$ independently are selected from the group consisting of a hydrogen atom, a substituted or unsubstituted alkyl group having 1 to 24 carbon atoms, a substituted or unsubstituted aryl group having 6 to 24 carbon atoms, and a substituted or unsubstituted aralkyl group having 7 to 24 carbon atoms,
   wherein the weight average molecular weight of said polysilane is 5,000 to 1,000,000; and
   (b) particles having a particle size of 10 to 500 Å, selected from the group consisting of conductors wherein the conductors comprises one or more metals or metal alloys.

2. A polysilane composition according to claim 1, wherein at least one of $R^1$ and $R^2$ contains a hydrophilic group or a hydrophilic linkage.

3. A polysilane composition according to claim 2, wherein the hydrophilic group or linkage is selected from one or more of the group consisting of a hydroxyl group, an amino group, a carboxylic acid group, a carbonyl group, a mercaptyl group, an ether linkage, an amide linkage, an ester linkage, a carbamate linkage, a carbonate linkage, an imide linkage, a thioether linkage, and a thioester linkage.

4. A polysilane composition according to claim 1, wherein said conductors are selected from one or more of the group consisting of gold, silver, platinum, palladium, copper, and rhodium.

5. A polysilane composition according to claim 1, comprising 1 to 40 volume % of said particles based on the volume of said polysilane.

6. A polysilane composition according to claim 1, wherein the particle size of said particles is such that a quantum size effect of said particles is shown on irradiation with light.

7. A polysilane composition according to claim 1, wherein the polysilane has 20 to 10,000 repeating units of formula (I).

8. A polysilane composition according to claim 1, wherein the polysilane has 80 to 500 repeating units of formula (I).

9. A polysilane composition according to claim 1, wherein the polysilane has a weight average molecular weight of 10,000 to 50,000.

10. A polysilane composition according to claim 1, wherein the particles have a particle size of 10 to 100 angstroms.

11. A polysilane composition according to claim 1, wherein the particles have a substantially uniform particle size.

12. A polysilane composition according to claim 1, comprising 5 to 20 percent by volume of the particles based on the volume of the polysilane.

13. A polysilane composition according to claim 1, which has a value of $\chi^{(3)}$ of about $10^{-10}$ esu or more.

14. A polysilane composition according to claim 1, which has a value of $\chi^{(3)}/\alpha$ of more than about $10^{-12}$ esu, wherein $\alpha$ is absorbance.

15. A polysilane composition according to claim 1, which is produced by forming a film of the polysilane on a substrate and then adding the particles onto the film.

16. A polysilane composition according to claim 15, wherein the polysilane film is formed on the substrate by spin coating or the Langmuir-Blodgett method and the particles are added to the film by sputtering or evaporation.

17. A polysilane composition according to claim 15, wherein after the addition of the particles onto the film, a second polysilane film is formed on the particles.

18. A polysilane composition according to claim 1, wherein the particles are present in an amount so as to improve the third-order non-linear optical constant of the composition.

19. A polysilane composition according to claim 1, wherein one or both of $R^1$ and $R^2$ are substituted with an —OH group.

20. A polysilane composition according to claim 1, wherein the conductor particles comprise metallic gold.

21. A polysilane composition according to claim 1, wherein the conductor particles comprise metallic silver.

22. A polysilane composition according to claim 1, wherein the conductor particles comprise metallic copper.

* * * * *